United States Patent [19]

Bertenshaw et al.

[11] 4,437,169

[45] Mar. 13, 1984

[54] STAGE LIGHTING CONTROL SYSTEM

[75] Inventors: David R. Bertenshaw, Chertsey; Edwin P. Lockwood, Brentford; Anthony R. Brown, London, all of England

[73] Assignee: The Rank Organisation Limited, London, England

[21] Appl. No.: 259,678

[22] Filed: May 1, 1981

[30] Foreign Application Priority Data

May 1, 1980 [GB] United Kingdom ............... 8014562

[51] Int. Cl.³ .......................... G06F 3/05; H05B 37/02
[52] U.S. Cl. .................................. 364/900; 315/291; 315/292
[58] Field of Search ... 364/200 MS File, 900 MS File; 315/291, 292, 316, 294

[56] References Cited

U.S. PATENT DOCUMENTS

| 3,579,030 | 5/1971 | Bentham et al. | 315/291 |
| 3,706,914 | 12/1972 | Van Buren | 315/316 |
| 3,766,431 | 10/1973 | Isaacs | 315/292 |
| 3,784,874 | 1/1974 | Barret et al. | 315/294 |
| 4,057,751 | 11/1977 | Bonsignore et al. | 315/316 |
| 4,112,425 | 9/1978 | Zobrist et al. | 340/347 AD |
| 4,161,027 | 7/1979 | Russell | 364/492 |
| 4,180,860 | 12/1978 | Driscoll et al. | 364/900 |
| 4,240,011 | 12/1980 | Dinges et al. | 315/292 |

FOREIGN PATENT DOCUMENTS

| 1171915 | 11/1969 | United Kingdom . |
| 1173211 | 12/1969 | United Kingdom . |
| 1220815 | 1/1971 | United Kingdom . |
| 1224236 | 3/1971 | United Kingdom . |
| 1332176 | 10/1973 | United Kingdom . |
| 1362591 | 8/1974 | United Kingdom . |
| 1520647 | 8/1978 | United Kingdom . |

OTHER PUBLICATIONS

"Sitralux B30, A Lighting Control System for Stages and TV Studios" Müller, Seyschab, and Tome, Siemens Review XLV, Sep. 1978, No. 9.

"Intelligent Lamp Dimmer for Studio Lighting", D. P. Burton Design Focus, vol. 11, No. 14, pp. 42 and 44, Jul. 1978.

Scholz et al., "Sitralux M, a Compact Control System for Stage and Studio Lighting", Seimens Review XLIII, (1976), No. 2, pp. 57-59.

Primary Examiner—Jerry Smith
Assistant Examiner—Mark P. Watson
Attorney, Agent, or Firm—Brisebois & Kruger

[57] ABSTRACT

A stage lighting control system having a main processor unit and a portable desk controller, wherein a local microprocessor is provided in the portable desk controller to scan the dimmer control contacts in the desk and to transmit changed state control data to the main processor as an asynchronous serially coded signal on a low capacity link which enables the controller to be conveniently located remote from the main processor. Changed display data is developed by a visual display unit (V.D.U.) interface in the main processor for transmission on the low capacity link as standard composite video to a V.D.U. at the desk. Output to the dimmers circuitry is through an expansible plurality of output channel processors controlling groups of dimmers for efficient data formatting. Lighting level information is recorded in accordance with a channel code, patching means being provided to enable differing arrangements of dimmers circuitry to be controlled in accordance with the recorded lighting level information.

7 Claims, 2 Drawing Figures

STAGE LIGHTING CONTROL SYSTEM

FIELD OF THE INVENTION

This invention relates to a stage lighting control system.

BACKGROUND OF THE INVENTION

In the field of stage lighting, it is known to provide a memory facility into which can be stored information relating to the dimmer levels necessary to produce various lighting effects. This information is pre-stored, for example during a rehearsal, in a main processor herein referred to as the rack, and can be recalled (played back) during a performance by operating (cueing) various controls such as faders on a control console. It is preferably possible for the control console to be separable from the rack in order to permit its location at a chosen site from which the stage is visible. By means of such a memory control system complex lighting effects can be achieved, involving the simultaneous adjustment of the levels of many individual dimmers by the use of linked controls referred to as masters, which effects would otherwise be virtually impossible to synthesize at the time owing to the large number of simultaneous controlled adjustments which would be necessary.

OBJECT OF THE INVENTION

It is an object of the present invention to provide an improved memory lighting control system, in particular enabling limited capacity microprocessors to be employed to achieve at least the same operational and computational capacity as mini-computers which have hitherto been employed.

BRIEF SUMMARY OF THE INVENTION

According to one aspect of the present invention, there is provided a stage lighting control system comprising a main processor unit including a memory for storing information relating to the dimmer levels necessary to produce various lighting effects; a portable controller having read/write selection means and a range of dimmer level control elements, said portable controller also incorporating a local processor unit adapted to scan the range of control elements to detect changes of state therein, an address memory for storing address data relating to the memory in the main processor unit, and a multiplexer for producing a coded signal containing selected address data and changed state data; and a low capacity cable link connecting the main processor unit with the portable controller.

Thus, in systems used hitherto, it has been the practice for the main processor in the rack to include, as part of its operating program, a facility for scanning the controls at the control console. It was therefore necessary to provide a high capacity data link (at least 300 k bytes per second) between the rack and the control console in order to avoid slow response within the main processor. The large connecting cable containing parallel address and data wires was thus very large and cumbersome, and severely limited the portability of the control console.

However, in accordance with the invention, in which only the changed state data is transmitted, the information speed required is only about 2 k bytes per second for combined address and control element data, and for this speed of transmission the data can readily be time multiplexed into a standard asynchronous serial code for transmission to the rack on a two wire circuit. The rack processor is freed of the part of its program originally required for scanning, assisting its processing efficiency.

The transmission of changed display data from the rack to a display unit forming part of the control console can be effected in similar manner. Thus, the control console can be connected to the rack by a link circuit consisting of only four wires, which can easily be extended to a considerable length (such as 500 to 1000 m), enabling the control console readily to be sited at any preferred location within the theatre.

FURTHER FEATURES OF THE INVENTION

According to a preferred aspect of the invention, the main processor unit has a large plurality of coded output channels for providing level control signals to a corresponding plurality of dimmers, the output channels in the main processor unit being fed through a patching means which can be patched to alter the dimmer which is controlled when a particular coded address in the memory is addressed from the portable controller.

In a conventional memory lighting control system, it has been usual to number the dimmers contiguously from 1 to a maximum, and to store lighting levels for each respective dimmer against its allotted number. This is satisfactory when the memory is specifically tailored to one particular theatre and is intended for use solely in that theatre. However, if the memory is required for use in a number of theatres, for example when a production is on tour, it is a disadvantage that in different theatres the same numbered dimmer may cause different lighting effects. In addition, wiring errors can occur whereby a dimmer having a particular number does not produce the effect that it should.

In the present invention, lighting levels are stored in memory in association with channel codes, i.e. channels coded by number or by alpha-numeric identity for example. Thus, when the memory is used in a different theatre, or when wiring errors must be dealt with, the patching means can be used to ensure that the original channel code (address in the memory) controls a different dimmer (numbered or otherwise coded output channel) to achieve the original lighting effect. This has the advantages that operators' notes and lighting designs can be kept unchanged with different arrangements of the dimmer's wiring.

More especially, this feature of the invention is important in connection with the provision of a portable memory such as a floppy disc peripheral to the main control system but which can be interfaced with the rack. In this case, there will be provided means on the portable controller for initiating transfer of information between the memory in said main processor unit and said portable memory, optionally including patching information, and second means on the portable controller enabling the portable memory to control the dimmers through the patching means.

According to another preferred aspect of the present invention, the memory of the main processor unit has a current store and at least one preset store for containing the information relating to the dimmer levels necessary to produce various lighting effects, and this information is outputted on a plurality of groups of output channels for providing level control signals to the plurality of dimmers, a plurality of slave microprocessors being provided, one for each group of output channels, each for performing hierarchical calculations on information data fed from the current and preset store or stores in accordance with instructions contained in an associated random access memory updated from the main processor unit which exchanges changed state information with the portable controller.

Preferably, the hierarchical calculations are performed cyclically and are output from the slave microprocessor of each group through analogue sample and hold circuits, one such circuit for each dimmer channel. In addition, each group of output channels preferably has a channel register serving to index an address store in a memory for the slave microprocessor, each channel register being duplicated with a positional offset so that the respective channel processors respond to different coded address sections in the dimmer level memory.

Thus, in one arrangement of the lighting control system in accordance with the invention, each dimmer is controllable by a "move fade" in the stage (current) output store and/or a highest-take precedence output from a plurality of, for example ten, preset stores, each individually mastered. A move fade may also occur in any one preset store. The dimmers level is calculated on a repetitive cycle of approximately 30 to 50 ms (sufficiently) short to avoid visible stepping on the lights as the fade progresses), and the output to the dimmers is fed through the analogue sample and holds circuits.

The move fade is calculated for each channel as follows:

Mn = movement of master since preceding calculation ($\epsilon$Mn = 256)
Sn = preceding stage store level
Sn+1 = stage store level after new calculation
I = fade increment for particular dimmer (value = - start value less destination value)

whence $Sn+1 = Sn + M \times I/256$.

This is combined on a highest-takes-precedence basis (Λ) with the mastered preset stores as follows:
MPx = Preset store master × (0→256)
Px = Preset store × (0→255)
giving a dimmer output expression of:
Output = $Sn + 1 \Lambda MP_1.P_1 \Lambda MP_2.P_2 \ldots \Lambda MP_{10}.P_{10}$ Additionally, an identical calculation takes place on one preset store.

This calculation on a fast 8-bit microprocessor takes just under 1 mS. Conveniently, therefore, each output channel group may consist of 48 output channels, for which the dimmers outputs are calculated by the slave microprocessor for the group, a RAM memory array containing the operating program and the associated stores. The executive microprocessor performs the main system logic operations and updates the RAM memory arrays.

Such a system has the advantage that it can be expanded as necessary by the addition of output channel groups. Assuming a large system of say 16 output channel groups, the apparent address size is reduced by the provision of the channel registers which index the RAM memory array. With the associated positional offset, the full range of 768 outputs RAM (16×48) can be accessed by only 64 addressed bytes and the register.

BRIEF SUMMARY OF DRAWING

A practical arrangement of memory lighting control system in accordance with the invention is illustrated in the accompanying drawing, wherein.

DESCRIPTION OF EMBODIMENT

Figure 1A:
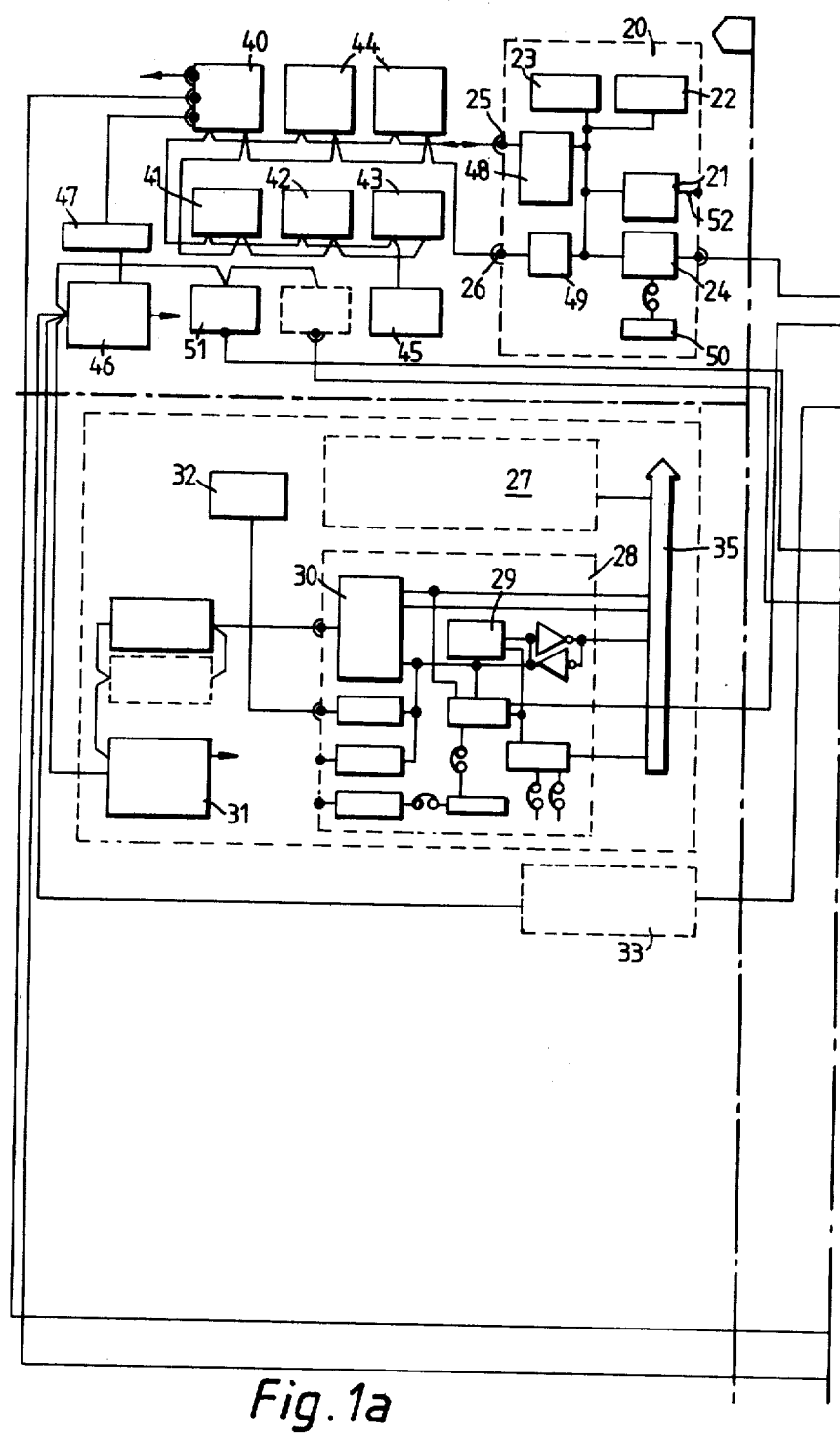
FIG. 1A shows a portable desk controller in block diagram form, together with a portable memory, and FIG. 1B, the left-hand side of which connects to the right-hand side of FIG. 1A, shows a main processor unit in block diagram form.
Figure 1B:
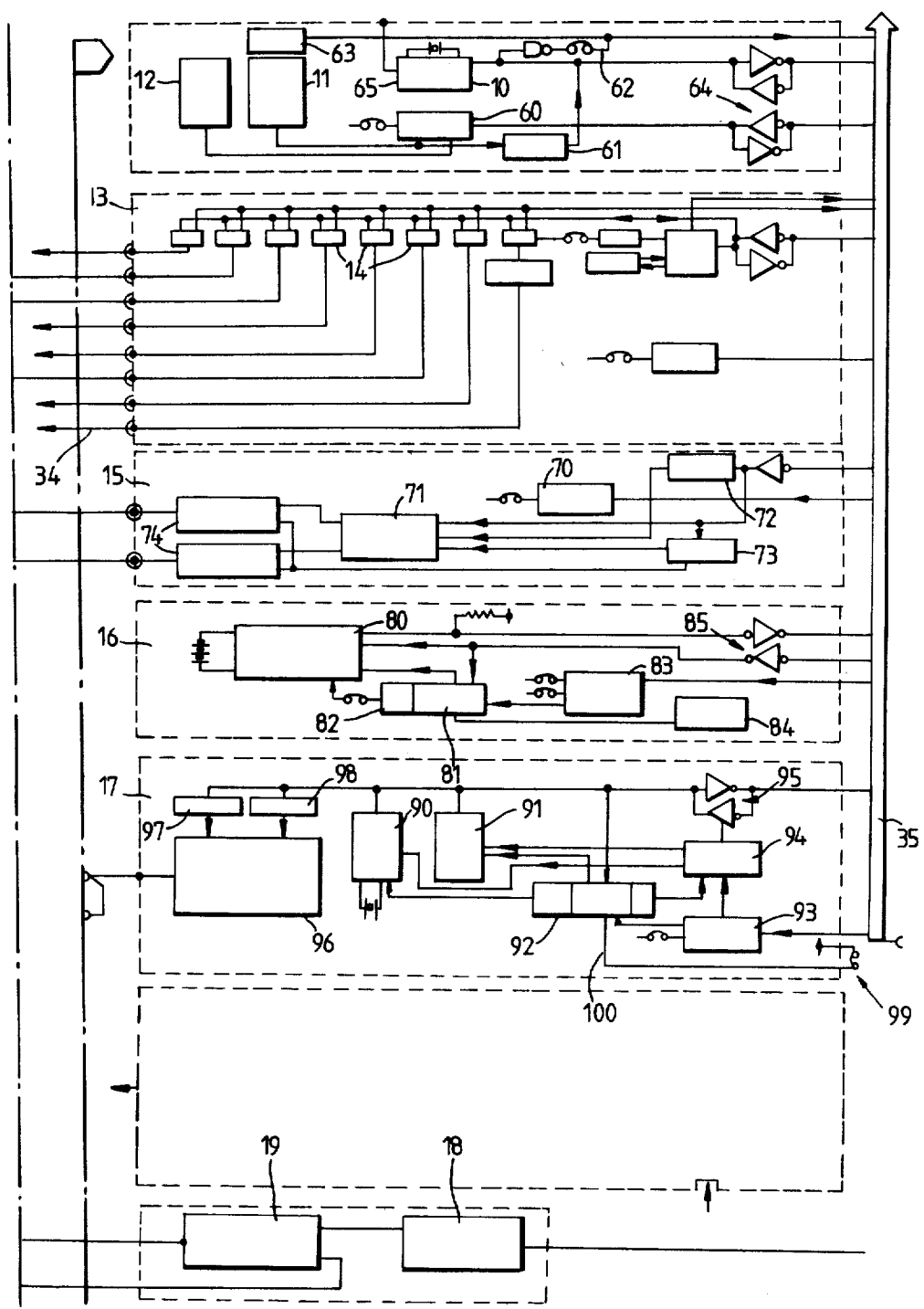

In the drawing, a control console (desk) is at the top of FIG. 1A. A main processor (rack) is shown in FIG. 1B, and is connected to the control console through a low data capacity 4 wire link which may readily be extended up to 1000 m. The bottom left hand side of FIG. 1A illustrates a portable memory (floppy disc) which is peripheral to the main system but can be interfaced with the rack to provide a back-up memory.

The rack essentially consists of a basic processor crate containing a host or executive microprocessor 10 incorporating PROM 11 and RAM 12, a serial interface board 13 containing asynchronous communications interface adaptors 14, a dual visual display unit interface board 15, a CMOS RAM lighting level memory board 16, and a plurality of channel processor boards 17 (of which only one is shown) each having 48 output channels. An optional interface permits the CMOS memory to be replaced with a ferrite core memory. The crate also contains a power supply unit 18 and a system power control 19.

In the remote desk, an interface board 20 contains a local microprocessor 21 with associated PROM 22 and RAM 23, outputting through an asynchronous serial link 24 to the rack. Two ports 25, 26 connect to the control panel motherboards to scan the contacts of the various dimmers level controls and the drive mimics.

In the floppy disc drive, an identical microprocessor 27 to that in the rack controls an interface board 28 containing supplementary RAM 29 and a drive controller 30 providing up to two drives. A power supply unit 31 is incorporated, together with a panel 32 presenting status and allowing initialization of diskettes.

In addition, the drawing shows a printer 33 interfaced with the rack and riggers connections 34 interfaced with the rack in accordance with required standards. In all instances, the interfaces incorporate the current loop asynchronous serial links ensuring the necessary signals isolation at the processor bus 35.

In more detail, the desk has a sub-panel 40 of memory number selection switches for selecting by memory number, as distinct from dimmer number, the memory channel into and from which information is to be written and read. A channel controller 41 enables one or more selected channels to be controlled, in association with a master wheel fader and a plurality of group masters designated 42. Generally similar fade controls are available at a preset store controller 43. Two automatic playbacks are provided, as indicated at 44. At least one visual display unit 51 is operative to indicate active channels, with the option to display channel levels. An alpha keyboard 45 enables supplementary matter to be displayed. A desk power supply unit 46 is connected to the motherboards through a lamp regulator 47.

Controls of the above-described form are generally conventional, and need not be described in detail. The essential feature of the desk, as far as the present invention is concerned, lies in the interface board 20. Here, the local memory 22, 23 is programmed such that the local microprocessor 21 cyclically scans the contacts of the various controls at the desk to produce a signal for transmission to the rack. The only data transmitted is that representing a change of state at the control contacts. The changed state data is then transmitted in an asynchronous serial code comprising pairs of 8 bit bytes, the first indicating the address of the data, the second the actual data. Changed state data is transmitted immediately, together with a mimic update transmission of all bytes, if requested by the rack to correct any errors. Once each cycle a sync. response byte is transmitted to the rack responsive to receipt of a sync. byte from the rack.

The above described desk to rack asynchronous serial code transmission is effected on a simple two wire link at a rate of about 2K bytes per second, fully sufficient to the processing speed required for proper lighting control.

The drawing also shows the buffers and decoders unit 48 provided in the interface board 20 at the digital port 25 connecting to the motherboards, the A/D and D/A converter unit 49 at the analogue port 26 connecting to the motherboards, the timer 50 providing serial data timing of 300–19,200 band, the asynchronous serial output adaptor 24 providing opto-isolation, and the processor test port 52.

The executive microprocessor 10 in the rack is programmed to process the changed state data received from the remote desk and to provide appropriate signals to the CMOS memory 16 and channel processors 17. However, this microprocessor 10 does not perform all the necessary logic operations necessary to derive the dimmer control signals. The signals fed to the channel processors 17 are intermediate signals which enable further logic operations to be performed to produce such dimmer control signals. The drawing also shows the address decoder 60 for executive microprocessor 10, the PROM delay circuit 61, the sync. and reset circuit 62 with its associated logic circuit 63, the tri-state drive and low power receive circuits 64, and the processor test port 65.

The next unit shown in the rack is the serial interface board 13. This unit is not of primary importance in relation to the present invention and will not be described in detail. Essentially it provides the optional input and output connections to the rack from peripheral equipment. One such connection will be mentioned specifically, and this is the connection to the floppy disc.

The rack also contains the dual visual display unit (V.D.U.) interface 15, which includes patchable address decoder 70, write only RAM 71 containing character codes and attributes and addressed by attribute register 72, V.D.U. timer 73 timing the production of the dot character array, and dual V.D.U. character generators 74. This write only unit generates the display information in accordance with display signals received from the channel processors 17 and transmits the generated character signals back to the V.D.U.s 51 in the control desk. The display signals form a composite video signal, compatible with standard video monitors and display the channels in use and their levels on the V.D.U.s. A separate link transmits changed display data from the rack to the desk, this data being time multiplexed into a serial code transmitted at the rate of 2K bytes per second.

The CMOS RAM lighting level memory board 16 stores the dimmer levels to be recalled under the control of the desk to fade the dimmers through the intermediary of the channel processors 17. This CMOS memory 80 can optionally be replaced by a ferrite core memory. The memory 80 is accessed by a page register 81 having a memory lock 82 and served by a patchable address decoder 83 and a page switch 84. Input/output is via tri-state drive—low power receive circuits 85. The CMOS memory 80, preferably battery maintained, is divided into 16 overlapping areas providing an economy of executive address utilisation, together with an address area for channel identification.

The final unit to be discussed in the rack is the channel processor 17. This comprises a slave microprocessor 90 associated with a RAM direct access memory 91, a resettable channel register 92 addressed through a decoder 93, an arbitration logic circuit 94, input/output connections 96 to the processor bus, an output to the dimmers circuitry through analogue sample and hold circuits 96 preceded by channel number and channel level regulators 97 and 98. Associated with the channel register 92 is a position offset patch 99.

Each channel register 92 handles two adjacent bytes respectively defining the channel group (up to 16) and the channel number (1 to 48) within the group, while the RAM 91 address area is divided into four groups of 16 stores for each of the 48 address channels. Thus by duplicating each channel register with a position offset 100, the full range of RAM locations (16×4×16×48) can be accessed by only 64 addressed bytes and a register. It is to be noted that the register 92 is addressed separately to the RAM 91 and is not accessible to the slave processor 90. The RAM 91 also contains operational instructions for the logical hierarchy operations to be carried out by the processor 90. The highest-takes-precedence processing which is effected has been previously described. In addition, the RAM 91 contains a copy of the two output registers which define the sample and hold channel number and level data utilised in the regulators 97, 98 feeding the sample and hold output circuits 96. These bytes written into these two output registers may be recalled either by the executive microprocessor or the slave microprocessor.

The above-described arrangement also provides a patch facility whereby it is possible to redirect levels read from the CMOS memory (or floppy disc), for identified channels, to alternative channels, before action by the channel processors. This enables, for example, similar lighting effects to be achieved with differing arrangements of the dimmers circuitry.

A separate patch facility, controlled by an emergency switch at the remote control desk, effects a change in the source of memory data, substituting the floppy disc for the CMOS or ferrite memory. This switch can thus be used as a back up in the event of main memory failure.

We claim:
1. A stage lighting control system comprising
   a main processor unit including a memory for storing information relating to the dimmer levels necessary to produce various lighting effects,
   a portable controller having
      a multiplicity of dimmer level control elements adjustable to define said information to be stored,
      electrical contacts associated with each said control element and whose state is changed by adjustment of said control elements, said contacts being connected in a scanning circuit,
      a local processor connected to the scanning circuit and having a memory programmed to cause the local processor cyclically to scan the control element contacts and detect changes of state therein, an address memory for storing address data relating to the memory in the main processor unit, means for selecting address data from the address memory, means for generating changed state data corresponding to the changed state of the contacts, a multiplexer connected to said address selecting means and said changed state data generating means for producing a coded signal containing the selected address data and changed state data, a display unit, and mode selection means for selecting the writing of data from the portable controller to the memory of the main processor unit and the playback of information from the main processor unit to the display unit, and a low capacity cable link connecting the main processor unit with the portable controller for the transmission of the coded signal and display information therebetween.

2. A system according to claim 1, wherein the multiplexer includes means for time multiplexing said address and changed state data into an asynchronous serially coded signal, the main processor unit includes signal receiving means for receiving the coded signal, the low capacity cable link including a two wire link communicating between said time multiplexing means and said signal receiving means.

3. A system according to claim 2, including means at the main processor unit for producing changed display data and means for generating a composite video signal and incorporating changed display data into said video signal, the low capacity cable link including a second two wire link communicating between said video signal generating means and the display unit at the portable controller.

4. A system according to claim 1, wherein the main processor unit has a plurality of coded output channels for providing lighting level control signals to a corresponding plurality of dimmers, a portion of the memory in said processor unit is allotted to storing under coded addresses information relating to the dimmer levels necessary to produce various lighting effects, and an alterable routing means connected between said memory portion and said output channels, said routing means being switchable to alter the dimmer channel which is controlled when a particular coded address in said memory portion is addressed.

5. A system according to claim 4, including a portable memory, interfacing means for interfacing said portable memory with the main processor unit, first control means on the portable controller for initiating transfer through said interface means of information to the main processor unit memory from said portable memory, means on the controller for optionally including re-routing data in the information to be transferred, decoder means in the main controller for receiving re-routing data and for switching the alterable routing means responsively thereto, and second control means on the controller enabling the portable memory to be used to directly control the dimmers.

6. A system according to claim 1, wherein the main processor unit has a plurality of groups of coded output channels for providing lighting level control signals to a plurality of groups of dimmer channels, and a plurality of slave microprocessors one for each group of output channels, each slave microprocessor comprising a memory containing an operational program of calculations to be effected in accordance with a predetermined order of precedence means in the main processor unit for updating the program memory in accordance with changed state data received from the controller an arithmetic unit, connected to said program memory and to the dimmers levels information memory of the main processor unit, for performing said calculations in the predetermined order of precedence on said information and a channel register accessible to the operational program memory, said channel register being stepped in accordance with address data received from the portable controller, whereby said arithmetic unit effects said calculations on said information in order of precedence related to the addressed dimmer channels within the group.

7. A system according to claim 6, including means in the slave microprocessors whereby the calculations in order of precedence are effected cyclically in relation to the addressed dimmer channels within each group, and a plurality of analogue sample and hold circuits, one such circuit for each dimmer channel, connected to receive the respective outputs from the slave microprocessors of the respective groups.

* * * * *